(12) United States Patent
Doyle et al.

(10) Patent No.: US 6,993,520 B2
(45) Date of Patent: Jan. 31, 2006

(54) INTEGRATED CONTENT MANAGEMENT AND BLOCK LAYOUT TECHNIQUE

(75) Inventors: Ronald P. Doyle, Raleigh, NC (US); David L. Kaminsky, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 10/047,842

(22) Filed: Jan. 15, 2002

(65) Prior Publication Data

US 2003/0135522 A1    Jul. 17, 2003

(51) Int. Cl.
*G06F 17/30* (2006.01)
*G06F 7/00* (2006.01)
*G06F 15/16* (2006.01)

(52) U.S. Cl. ............... 707/5; 707/10; 707/102; 707/200; 709/202

(58) Field of Classification Search ............... 707/2, 707/6, 10, 102, 200, 5; 715/501.1; 709/202; 705/501.1
See application file for complete search history.

(56) References Cited

U.S. PATENT DOCUMENTS

| | | | | |
|---|---|---|---|---|
| 5,918,229 | A * | 6/1999 | Davis et al. ............... | 707/10 |
| 5,968,125 | A * | 10/1999 | Garrick et al. ............ | 709/224 |
| 6,169,997 | B1 * | 1/2001 | Papierniak et al. ...... | 715/501.1 |
| 6,549,896 | B1 * | 4/2003 | Candan et al. ............ | 707/2 |
| 6,574,634 | B2 * | 6/2003 | Woehl ......................... | 707/102 |
| 2002/0078095 | A1 * | 6/2002 | Culham .................... | 707/516 |
| 2002/0147734 | A1 * | 10/2002 | Shoup et al. .............. | 707/200 |
| 2002/0174267 | A1 * | 11/2002 | Erdmenger et al. ...... | 709/330 |
| 2002/0184211 | A1 * | 12/2002 | Gruenwald ................. | 707/6 |
| 2004/0064500 | A1 * | 4/2004 | Kolar et al. ............... | 709/202 |

OTHER PUBLICATIONS

Noah: Low-cost file access prediction through pairs, Amer et al., IEEE, 2001.*

* cited by examiner

*Primary Examiner*—Jean R. Homere
*Assistant Examiner*—Kuen S. Lu
(74) *Attorney, Agent, or Firm*—Myers Bigel Sibley & Sajovec PA

(57) ABSTRACT

Techniques are disclosed for storing content in distributed computing environments to reduce storage overhead and improve efficiency and/or speed of accessing and delivering the stored content. A content management system (or other authoring system, such as a text editor) supplies hints about dependencies among objects or files, such as which objects are embedded into a web page and which objects are referenced by the web page. These hints are then used when deploying the corresponding files on a storage system, such that the files which are likely to be retrieved together are (preferably) stored together. Optionally, run-time observations by a web server may be used as input to this process to determine how best to store content during a subsequent redeployment.

15 Claims, 13 Drawing Sheets

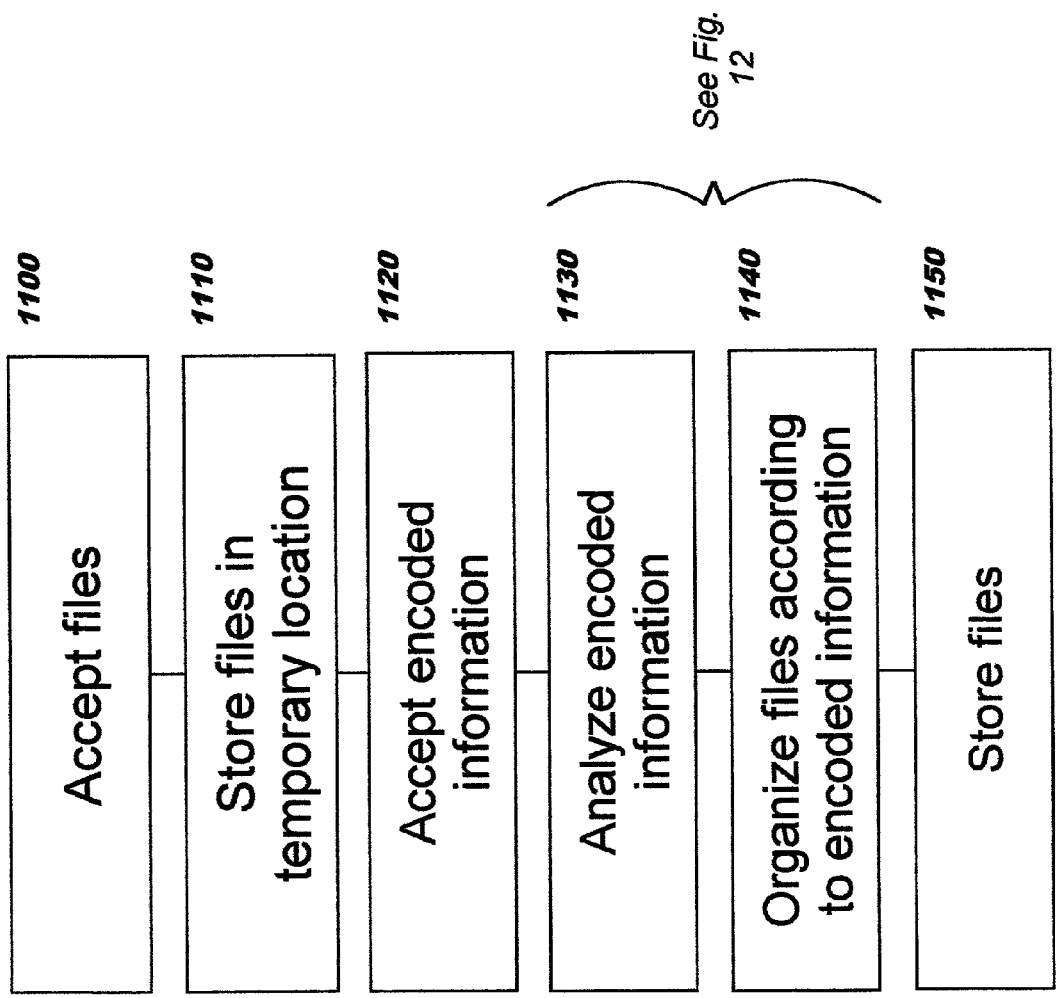

INTEGRATED CONTENT MANAGEMENT AND BLOCK LAYOUT TECHNIQUE

BACKGROUND OF THE INVENTION

1. Field of the Invention

The present invention relates to distributed computing environments, and deals more particularly with techniques for storing content in these environments to reduce storage overhead and improve efficiency and/or speed of accessing and retrieving the stored content.

2. Description of the Related Art

The popularity of distributed computing networks and network computing has increased tremendously in recent years, due in large part to growing business and consumer use of the public Internet and the subset thereof known as the "World Wide Web" (or simply "web"). Other types of distributed computing networks, such as corporate intranets and extranets, are also increasingly popular. As solutions providers focus on delivering improved web-based computing, many of the solutions which are developed are adaptable to other distributed computing environments. Thus, references herein to the Internet and web are for purposes of illustration and not of limitation.

Millions of people use the Internet on a daily basis, whether for their personal enjoyment or for business purposes or both. As consumers of electronic information and business services, people now have easy access to sources on a global level. Similarly, an enterprise's web-enabled applications may use information and services of other enterprises around the globe. While some content requests are generated programmatically, many content requests have a human user waiting for a response. Returning responses quickly and efficiently can therefore be critical to user satisfaction and to the overall success of an enterprise's web presence. Furthermore, for content types that have a time-sensitive aspect, such as streaming audio and streaming video, processing inefficiencies and network delays must be avoided to the greatest extent possible.

FIG. 1 provides a diagram of a representative server site 100 in which a content request is serviced. (The term "server site" as used herein refers to a collection of server nodes that serve web content associated with a given fully-qualified domain name. For example, the server site 100 in FIG. 1 may, for purposes of example, serve content for a domain name such as "www.ibm.com".) In this example, a content request 110 is transmitted from a client (not shown) through a network such as the Internet 120 and then to a load balancing host 130 (that is, a computing device which distributes incoming requests across a plurality of web servers 140 to balance the processing load). The load balancing host 130 may then select one of the web servers 140 (such as Apache, Netscape, or Microsoft servers), according to the load balancing strategy which has been implemented in host 130. To serve the requested content, a particular web server may invoke the services of an application server (such as a WebSphere® application server which is available from the International Business Machines Corporation, or "IBM"), where this application server may be co-located with the web server 140 in a single hardware box or may be located at a different device 150. The web server may also or alternatively invoke the services of a back-end enterprise data server 160 (such as an IBM OS/390® server running the DB/2 and CICS® products from IBM), which may in turn access one or more databases 170 or other data repositories. ("WebSphere®", "OS/390", and "CICS" are registered trademarks of IBM.) The load balancing host 130 may also function as a surrogate (reverse proxy cache) or intermediary (forward proxy cache). The IBM WebSphere® Edge Server is one implementation which provides this combined functionality. These network components are well known in the art.

As illustrated in FIG. 2, many modern storage systems 200 that may be used by any of the several devices of FIG. 1 are comprised of one or more interconnected physical storage devices 220. Software and/or hardware (not shown) within the storage system 200 function to provide a logical block abstraction layer 210 for the physical storage devices 220; applications using the storage system 200 to read and/or write data then access it via fixed-sized blocks 211.

The physical storage media of devices 220 are typically rotational media (such as disks) accessed by one or more read/write "arms"—that is, sensing devices that can read and write data on the media. Positioning the arms to read/write a particular block of data is a relatively slow operation, and therefore optimizing movement of the arms is a common goal in storage systems. A primary way in which arm movement is optimized is to attempt to locate data such that the physical arm movement can be limited to very short distances. Another common goal in storage systems is to locate data such that, once the arms are in a particular position, the data to be retrieved tends to be contiguous. These data location techniques are often referred to as minimizing the seek time and minimizing the rotational delay, respectively.

It is common for storage systems to optimize block layout on the physical media according to monitored disk access patterns. FIG. 3 is a schematic rendering of a storage system 300 comprised of physical storage devices 220, a usage monitor 310, and a layout optimizer 320. Usage monitor 310 tracks which storage blocks are requested most often. The layout optimizer 320 uses this data to optimize the layout of data on the physical devices 220. To avoid arm movement and rotational delays, blocks that tend to be accessed sequentially can be stored sequentially on the devices 220. The storage system 300 therefore monitors access patterns, and can rearrange the data (if required) to facilitate such sequential read access, thereby reducing the arm movement and rotational delay according to the observed patterns.

In addition, in systems with multiple read/write arms, blocks which tend to be accessed together can be spread among the media serviced by these arms such that the blocks can be accessed simultaneously (or nearly simultaneously). The arm scheduler is then responsible for ensuring that the arms are correctly positioned for the concurrent access operations.

The drawback to the prior art approach is that it relies on observed access patterns. In complex systems, it can be compute intensive and error-prone to detect such patterns. If the observation period is too short, spurious and non-recurring patterns can be detected; if the period is longer, then a larger amount of data is gathered, and must be culled to determine the patterns it represents. This analysis can be very time consuming and compute intensive, resulting in increased system overhead.

What is needed are improved techniques for placing content on storage devices to facilitate efficient content retrieval.

SUMMARY OF THE INVENTION

An object of the present invention is to provide improved techniques for placing content on storage devices.

Another object of the present invention is to increase efficiency of retrieving content from storage.

Yet another object of the present invention is to integrate content management systems and storage systems to improve access and retrieval of content in distributed computing environments.

Still another object of the present invention is to provide techniques with which information known to content management systems can be used to improve data storage systems.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for efficiently storing content. In one aspect of the present invention, this technique comprises: receiving hints regarding relationships among files; and using the received hints to allocate storage for the files. The hints may be created by a content management system, and preferably specify one or more files that are likely to be referenced within a temporal proximity of a reference to a selected one of the files.

The selected file may be a web page, and the one or more files may comprise at least one of (1) one or more embedded objects of the web page and (2) one or more other web pages which are hyperlinked to the web page.

In another aspect, the hints are created by a content authoring tool, and the hints specify one or more files that are likely to be referenced within a temporal proximity of a reference to a selected one of the files. The selected file may be a text document, and the one or more files may comprise one or more objects which are embedded within or referenced by the text document.

The hints preferably further specify weights which describe a degree of dependency for the relationships, and are preferably encoded in a markup language notation.

The technique may further comprise receiving a request for one of the files; retrieving the requested file from the allocated storage; and returning the retrieved file.

Optionally, the technique may further comprise using the received hints to create dependency information which is stored by a receiver of the hints in temporary or permanent storage; receiving a request for one of the files; and determining a read request strategy for the requested file by accessing the stored dependency information. The read request strategy may comprise determining selected ones of the files which should be pre-fetched along with a read of the requested file, for example by comparing a dependency weight of the files to a pre-fetch threshold. This optional processing may further comprise retrieving the requested file from the allocated storage; retrieving the selected ones from the allocated storage; caching the retrieved selected ones (and optionally caching the retrieved requested file as well); and returning the retrieved requested file.

The present invention may also be used advantageously in methods of doing business, for example by providing network hosting services wherein the delivery of content from storage operates in an improved manner. Providers of such services may offer these advantages to their customers for a competitive edge in the marketplace.

The present invention will now be described with reference to the following drawings, in which like reference numbers denote the same element throughout.

BRIEF DESCRIPTION OF THE DRAWINGS

FIGS. 8, 11, 12, and 13 provide flowcharts depicting logic which may be used to implement preferred embodiments of the present invention;

DESCRIPTION OF PREFERRED EMBODIMENTS

The present invention provides improved techniques for storing content in storage systems used in distributed computing networks. Using the techniques disclosed herein, storage system overhead is reduced, and efficiency and/or speed of accessing and retrieving stored content is improved. These techniques may be especially beneficial in web environments or other distributed computing environments, where they may be used to improve overall performance of web servers. (The term "content" as used herein refers generally to data, and may be considered synonymous with the terms "file" and "object".)

Figure 5:
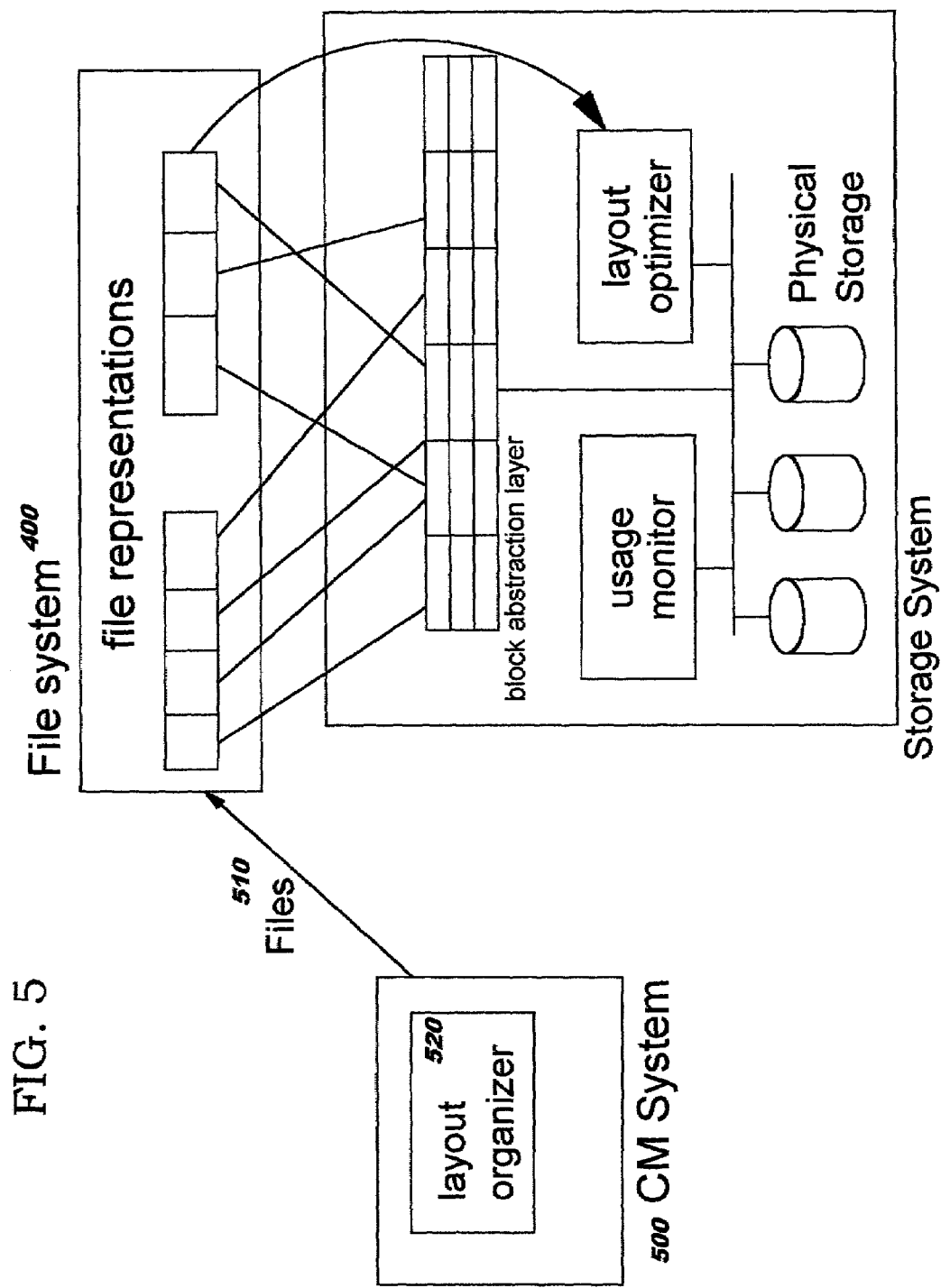
FIG. 5 illustrates a content management system sending file content to a file system, according to the prior art.

Many distributed computing environments include content management systems which are used to develop and deploy complex web sites. These content management systems do workflow management for web sites, and allow multiple authors to create objects that are assembled into web pages. For example, an author might submit text that is routed to a proofreader; a photographer might submit a picture; and a graphic artist might submit an image. Those items are then arranged according to a page layout defined by a page layout expert. One or more approvers can decide whether the page's components (or perhaps the entire page) are appropriate for publication. Referring briefly to FIG. 5, a content management system 500 is illustrated as sending file content 510 to a file system 400, which stores the content for subsequent retrieval. It is believed by the present inventors that existing storage techniques, which monitor disk accesses, are not optimized according to information supplied from web development and computing environments. The present invention therefore defines techniques for using content management systems to influence block layout and/or arm scheduling operations, as will be described.

Figure 1:
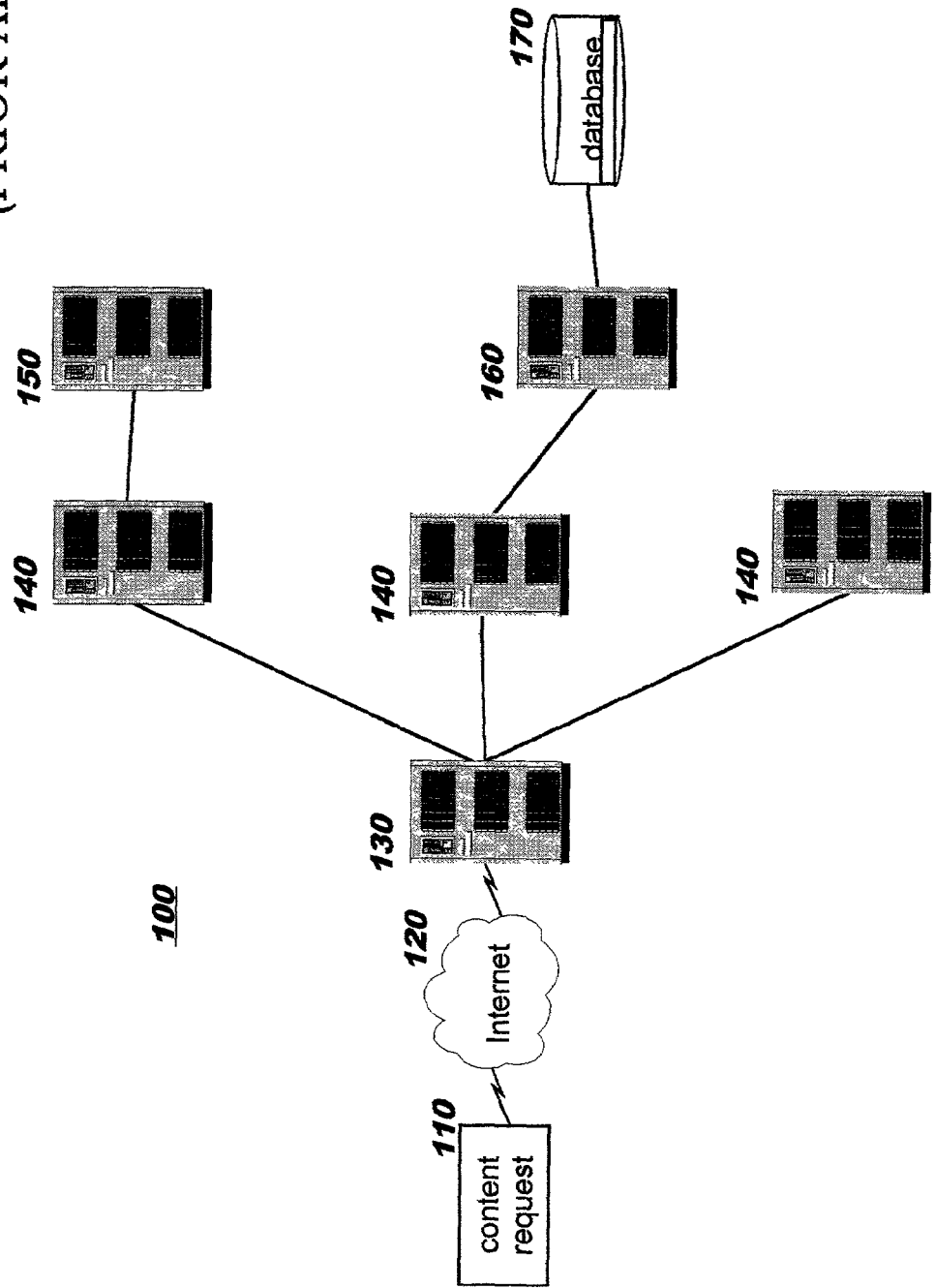
FIG. 1 is a diagram of a server site in which incoming content requests arrive and are serviced, according to the prior art.
Figure 2:
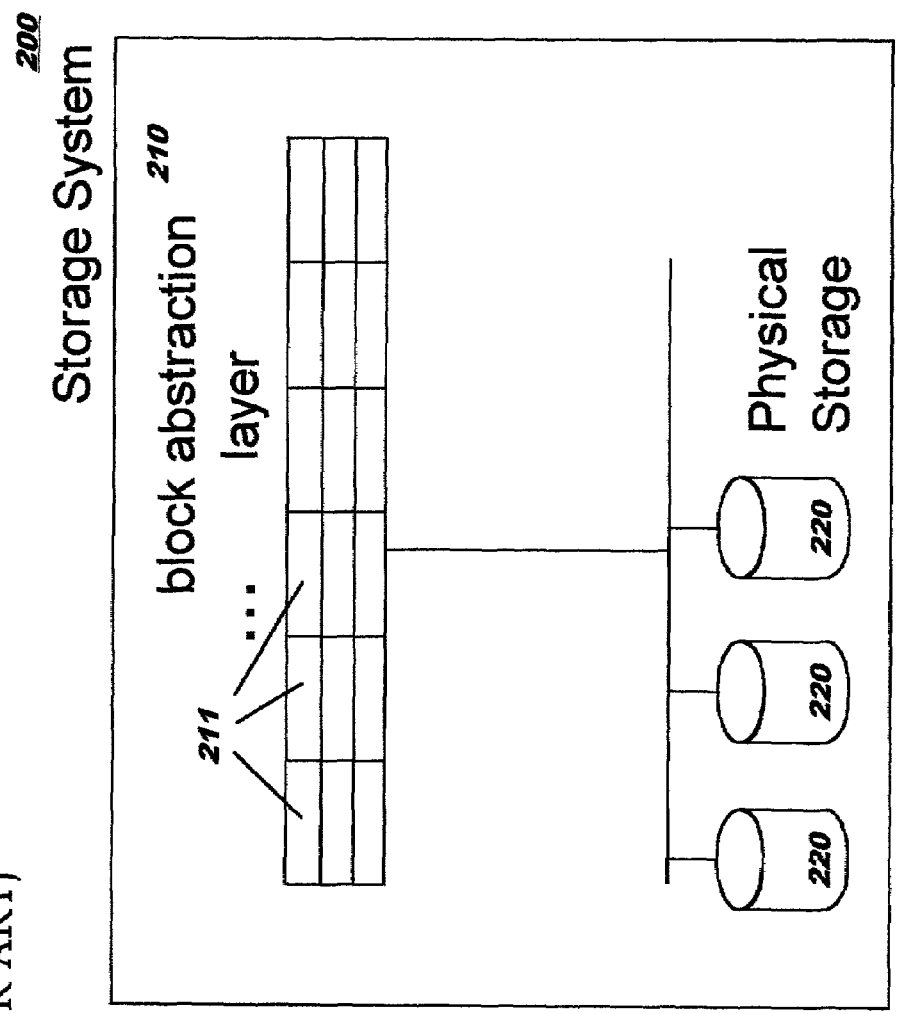
FIG. 2 illustrates a typical storage system of the prior art.
Figure 3:
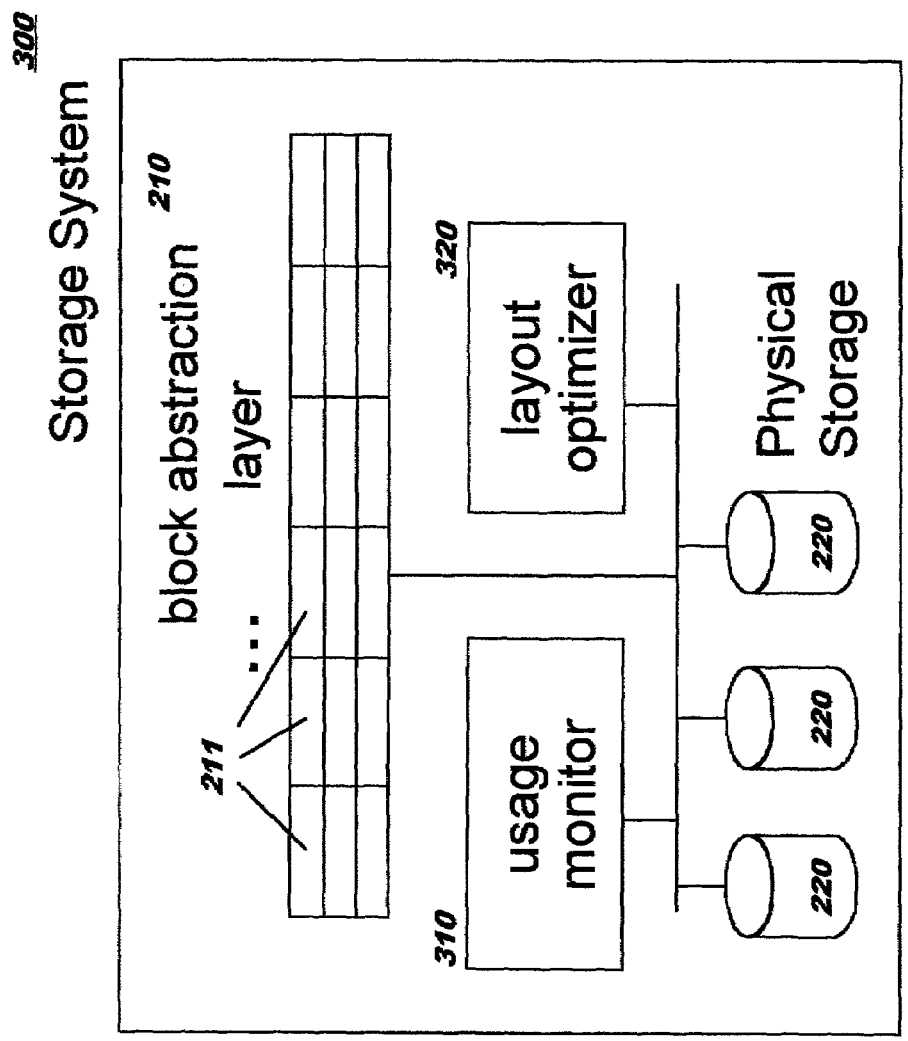
FIG. 3 is a diagram showing a storage system which includes usage monitoring and layout optimizing components, according to the prior art.
Figure 4:
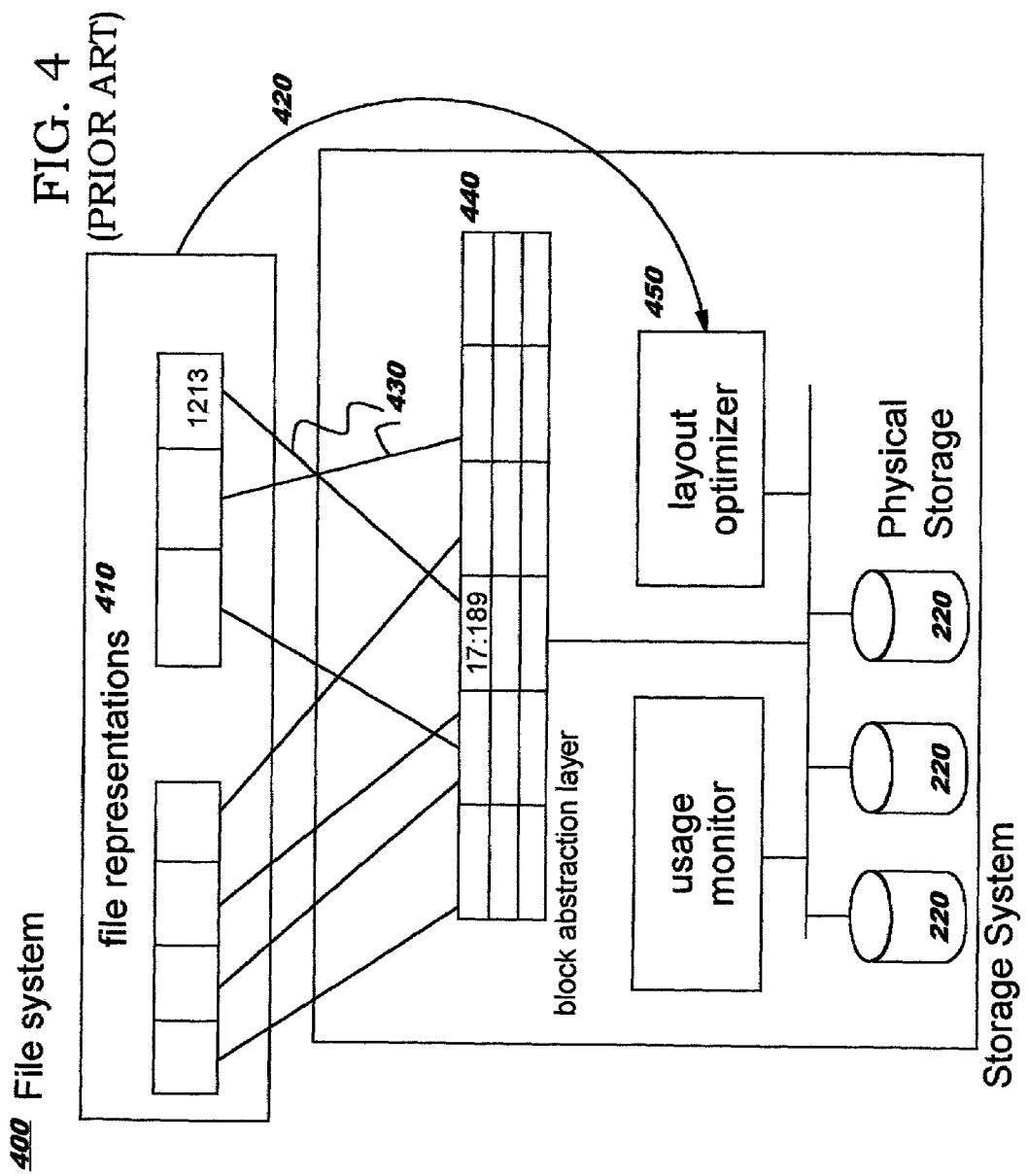
FIG. 4 is a block diagram illustrating a file system that manages a storage system, according to the prior art.

As further background, FIG. 4 illustrates a file system 400 that manages 420 a storage system, such as the storage system 300 described above, by transmitting an indication of the anticipated use of the data within a file to the layout optimizer 450. The layout optimizer 450 then considers this information when allocating storage 220. In the simplest case, since bytes of a file are often read sequentially, the file system attempts to lay out the bytes of a file in sequential blocks. File systems manage physical storage, creating and exporting an abstraction that is more convenient for application programmers to work with than is raw storage. This abstraction allows the programmers to deal with files—typically as a sequential array of bytes—rather than blocks in their applications.

File systems are typically comprised of a set of file representation data structures ("FRDS") 410. In some file systems, these FRDS are referred to as "inodes". Each FRDS contains information about a file, such as its creation time, last access time, etc. The FRDS also contains a mapping (shown generally as 430) of the file abstraction to the blocks 440 exported by the storage system from the physical storage media 220. For example, byte number 1213 in a file might be mapped to byte number 189 on block number 17. An access request for byte 1213 will result in the file system retrieving block 17, then locating byte 189. (File systems and these file system concepts are well known in the art.)

Content management systems accumulate substantial information about expected use of a web site. Within a web page, content management systems can infer which elements will tend to be viewed together. For example, when a particular web page includes embedded references to image files, it can be inferred that the embedded content will need to be retrieved along with the content defined within the page itself. Content management systems also typically know which pages will likely be requested in sequence, even though such requests often may be separated by many seconds or minutes. In some cases, a human provides this information to the content management system, based upon his/her understanding of the content and/or knowledge of runtime access information. In other cases, this information may be programmatically derived. However, the present inventors know of no existing systems which integrate the content management system's expected/observed usage information with the storage system to arrange file content.

With reference to FIG. 5, as is known in the art, a content management system 500 includes a layout organizer 520 that tracks the dependencies among objects used on a web page. For example, if a page includes an image, then the layout organizer stores this dependency. Arrow 510 shows content management system 500 deploying files to the file system 400.

Figure 6:
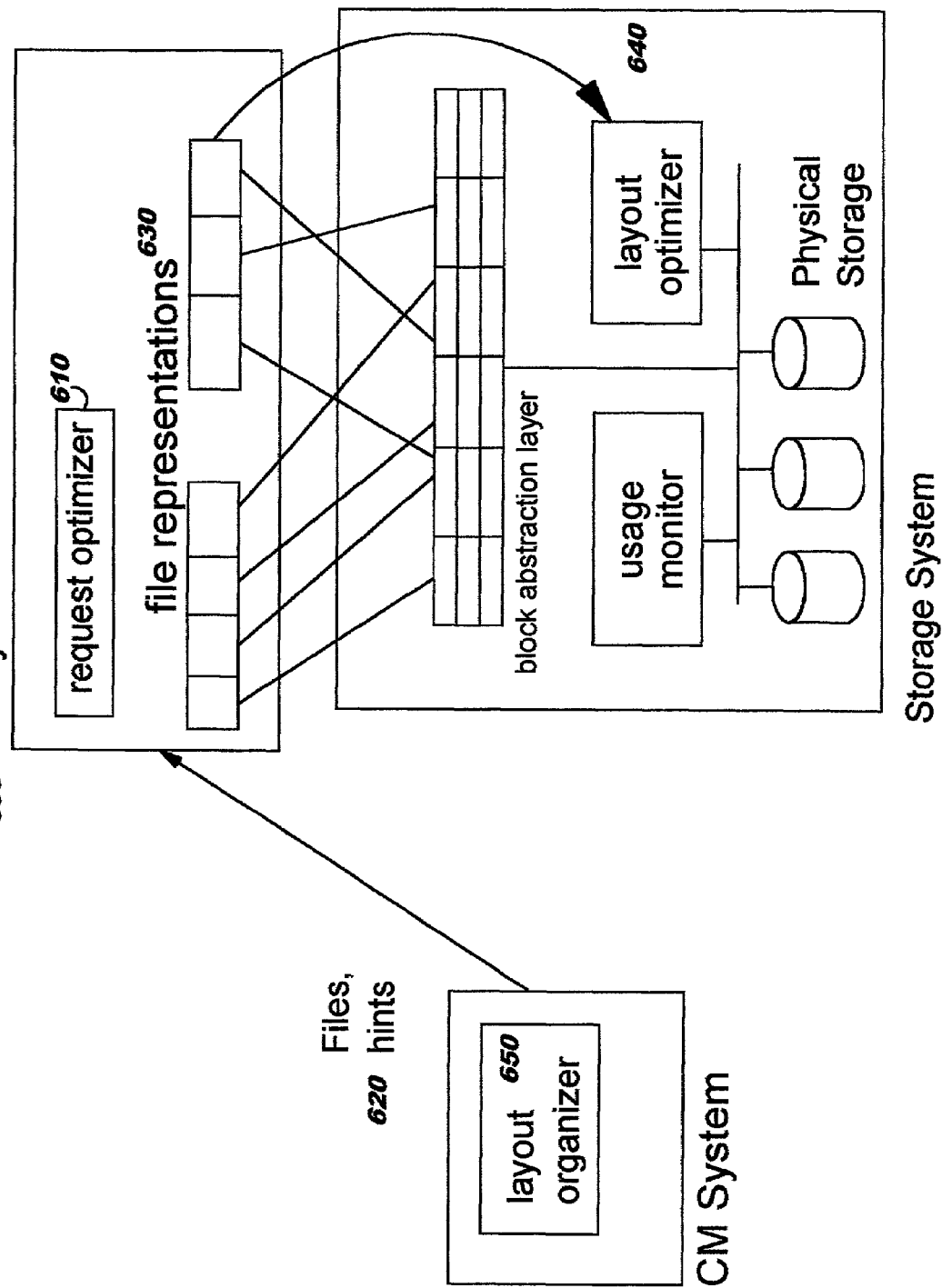
FIG. 6 provides a block diagram illustrating interaction of a content management system, a file system, and a storage system, according to preferred embodiments of the present invention.

FIG. 6 illustrates an improvement to the prior art. Arrow 620 illustrates the content management system passing "hints", in addition to the file, to a request optimizer 610 of file system 600. The storage schedulers (such as layout optimizer 640, for example) which are used by prior art storage systems account for many factors when scheduling block retrieval. The present invention defines a straightforward mechanism for supplying the hints from content management systems to these storage schedulers, where these hints are then used as input by the storage schedulers to their scheduling decisions.

More generally, the techniques of the present invention are applicable not only to use with content management systems, but also to use with other authoring tools. For example, many text editors support linked images (that is, images which are stored in a separate file and are embedded by reference into a text file). The text editor therefore knows that when the text is to be rendered, so are the referenced images, and thus these text editors can also provide hints which are analogous to those described herein.

An optional aspect of the present invention provides a loopback process in which actual access data which is gathered during run-time by web servers (or equivalent components) is fed back to the content management system (using prior art feedback techniques). The content management system then feeds this information back to the storage system, according to the present invention, as a more "emphatic hint" upon content redeployment (that is, a hint which is based on actual run-time access information).

Referring again to FIG. 6, the block diagram illustrates interaction of a content management system, a file system, and a storage system according to preferred embodiments of the present invention. The content management system's layout organizer 650 determines likely access patterns, and transmits that information to the file system as hints 620.

When content is created using a content management system, the content management system tracks the relationships among the content elements (preferably, both intra-page and inter-page elements). For each object, data are retained about the objects referenced by it, and the type of references (for example, whether a related object is a link to embedded content, a selectable link such as a hyperlink, and so forth). A number of existing content management systems provide this type of dependency information. When the objects are deployed, this information is transmitted to the file system 600 according to the present invention. Arrow 620 in FIG. 6 depicts the content and hints being transmitted. (It should be noted that separate messages may be used for transmitting content and for transmitting hints, and thus the presence of a single arrow is not meant to imply limitations on the manner of transmission.) As the file system writes the data to blocks of the storage system, it passes along 640 the information obtained from the content management system's hints. The block allocation system (i.e. the component responsible for creating the block abstraction layer) returns to the file system information regarding the block allocation employed, and this information is stored in the file system's information structure 630 (that is, the FRDS). (Note that storage systems currently return this type of block allocation information for storage in FRDS, as this is necessary for file system operation. For example, the file's storage location information is stored in the FRDS so that the file system can access the stored content in response to subsequent retrieval requests.) The present invention enhances the decision as to where the content will be stored, as will be described in more detail herein.

Figure 7:
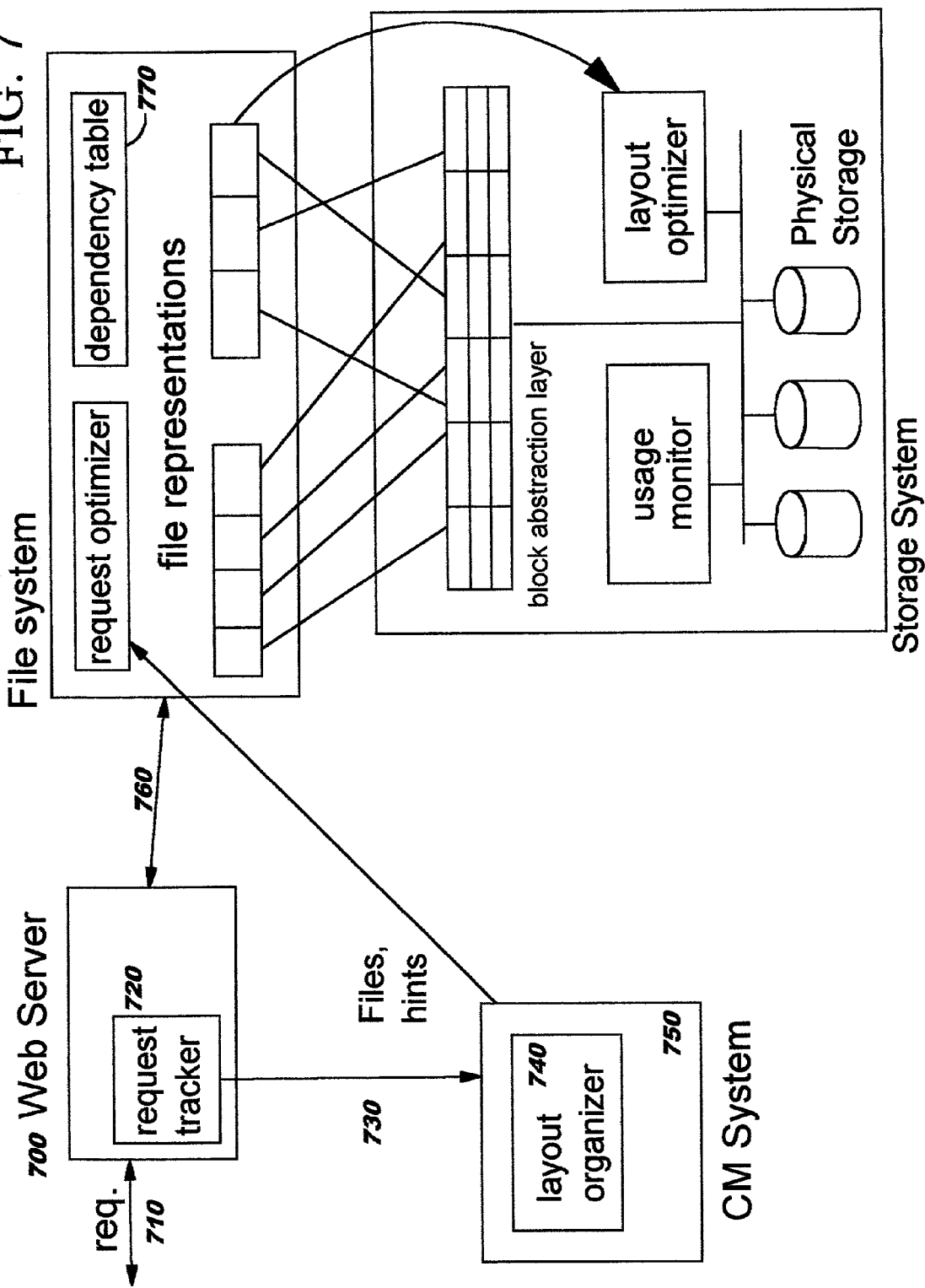
FIG. 7 shows interactions between a web server, content management system, file system, and storage system for content retrieval, according to preferred embodiments of the present invention.

Referring now to FIG. 7, interactions are illustrated between a web server, content management system, file system, and storage system for content retrieval. When a file retrieval request 710 is made to a web server 700, the web server requests 760 the file from the file system. According to an optional aspect of the present invention, the file system uses the information it received from the content management system to determine the proper read pattern. For example, the file system may have stored content for a particular file in contiguous locations, based on information it received from the content management system. (See the discussion of element 620 of FIG. 6.) In this case, a subsequent read request for that stored content may benefit from the contiguous storage: if the content needed for servicing the request is stored in consecutive blocks, the file system simply issues a read request to retrieve this content (as this approach will optimize arm movement). If the content is not contiguous, on the other hand, then the retrieval operation depends on the affinity among the various objects which are to be retrieved. A dependency table 770 is shown, which may be used to store the relationship information which was learned from hints sent by the content management system when storing content. (As will be obvious, a table is merely one way in which the relationship information may be stored.) This optional aspect may therefore use the information in table 770 to pre-fetch content during a retrieval operation. For example, suppose two objects "x.jpg" and "y.html" are used by a particular web page "x.html" but that these objects are stored at different (non-contiguous) locations. Upon receiving a retrieval request for "x.html" the file system will access the dependency table 770, learn of its related objects "x.jpg" and "y.html", and may decide to issue reads for those objects as well as for the page "x.html"—based on an assumption that the related pages are likely to be requested soon. Preferably, the page and its objects are cached once they have been read. This process is further described below, with reference to FIG. 13.

The technique illustrated in FIG. 7 applies when a web server retrieves content from a file system. However, in some cases, a web server uses raw storage. In this case, the web server maintains analogous layout data structures to those of the file system's FRDS, and uses these data structures in a similar manner to how the file system uses the FRDS. In this case, components of the file system which are used for supporting the present invention may simply be included in (or otherwise accessed by) the storage system component of the web server.

In the optional loopback aspect which was discussed earlier, web server 700 includes a request tracker component 720 which monitors requests for particular content and feeds this information back 730 to layout organizer 740 of the content management system 750. The layout organizer then includes this information when subsequently requesting the file system to redeploy the corresponding content. In preferred embodiments, the tracker component provides information regarding the number of accesses to particular content, as well as information regarding access patterns among content (which may include names of objects and/or temporal information pertaining to these accesses, such as the time interval between accessing certain objects). Techniques for collecting this type of information by the web server do not form part of the present invention.

Figure 8:
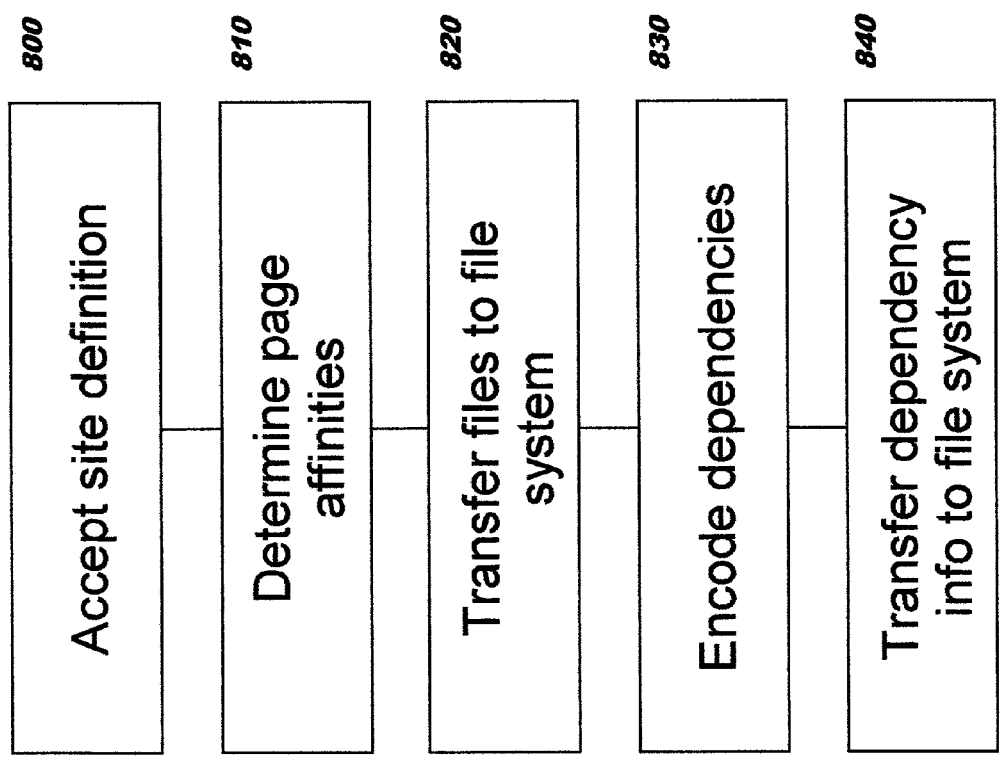

Referring now to the flowchart FIG. 8, logic is depicted which may be used to implement preferred embodiments of the present invention and comprises additional processing performed by a content management system which operates according to the present invention. Once the web site author completes a site, he transfers the site definition to the content management system, which accepts the definition (Block 800). The layout organizer component (or analogous component which may be included in, or accessed by, the content management system) then analyzes the site's content for relationships and dependencies (Block 810), for example to locate images embedded in a web page. The files to be deployed are then transmitted to the file system (Block 820). The information about the relationships and dependencies is encoded (Block 830), creating a form of the hints which were previously described, and this information is also transferred to the file system (Block 840). (Examples of syntax which may be used for encoding hints are shown in FIGS. 10A and 10B, and are described below with reference to the relationships and dependencies illustrated in FIG. 9.)

It should be noted that the ordering of the processing in FIG. 8 may be altered in a particular implementation, and/or processing may be combined. For example, the file transfer in Block 820 may be performed after the dependencies are encoded in Block 830, and furthermore, the transfer operations in Blocks 820 and 840 may be combined in some implementations.

When the optional loopback aspect is implemented, then at least some of the hints sent to the file system in Block 840 reflect actual operational access patterns, where this information was received from a web server as shown at 730 in FIG. 7. The content management system may factor this operational information into the hints it transmits in Block 840; alternatively, a distinct message may be sent to the file system to convey the operational information (where this message preferably has a special message code or identifier to signify that operational information provided by the web server, rather than relationship and dependency information provided by the content management system, is being transmitted).

Figure 9:
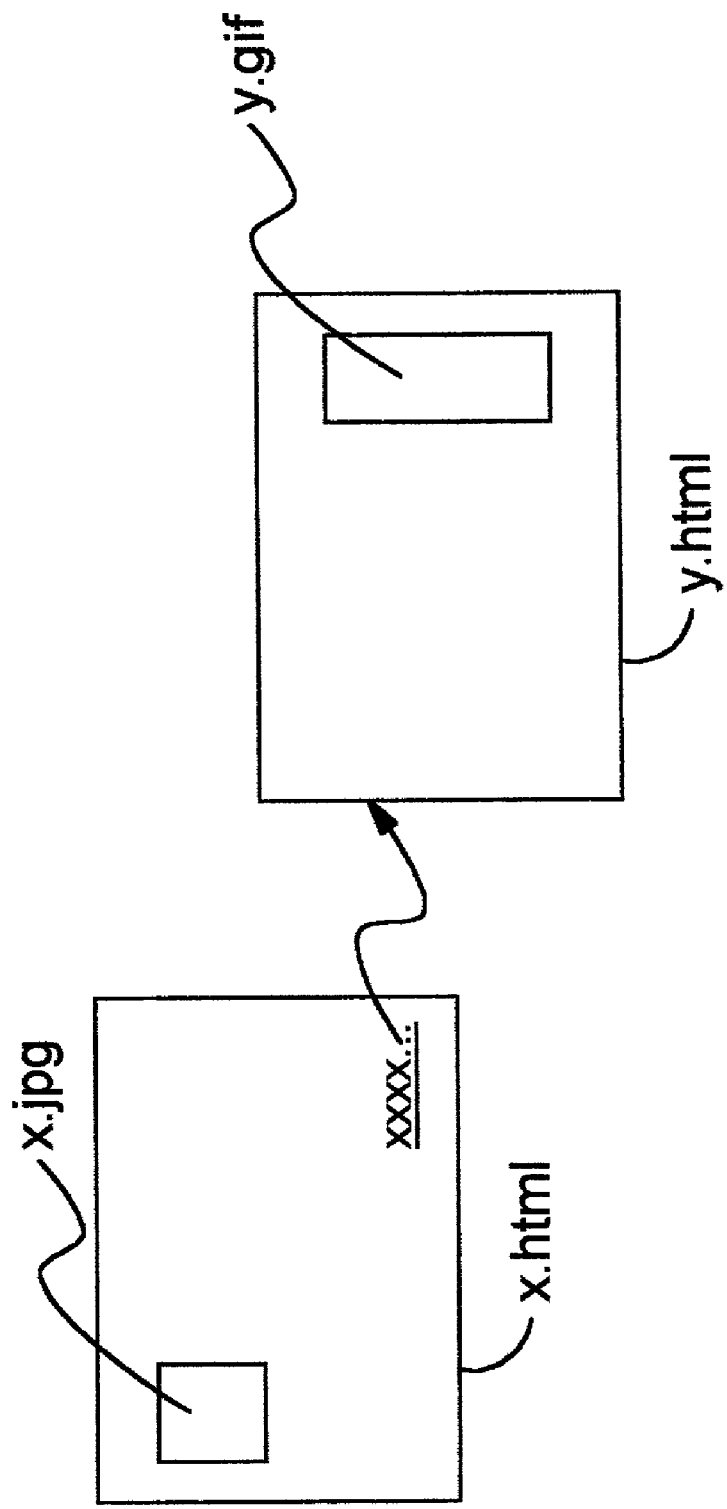
FIG. 9 illustrates sample web pages and objects which are used in describing operation of the present invention.
Figures 10A, 10B:
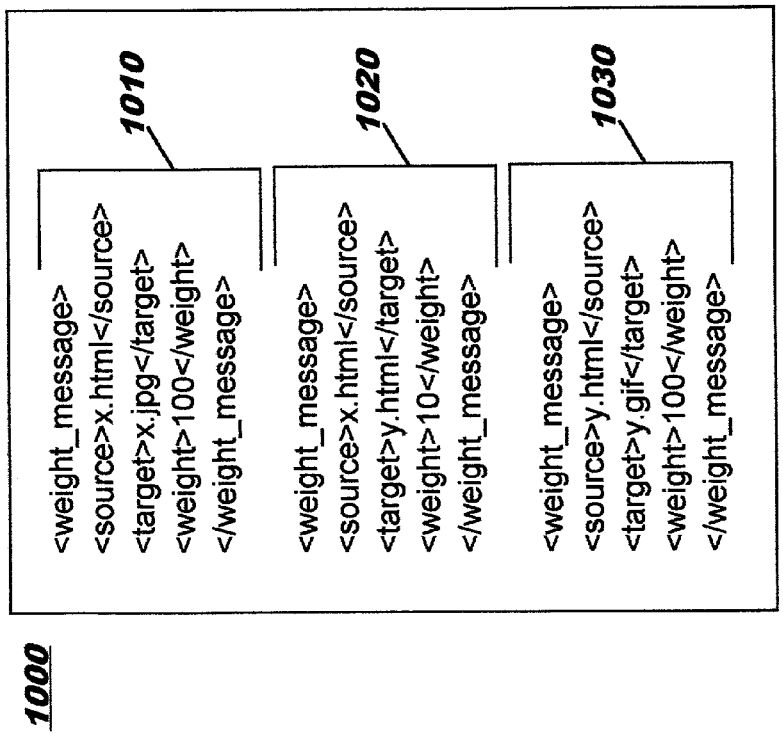
FIGS. 10A and 10B show sample syntax forms which may be used to describe content relationships and dependencies, according to the present invention.

FIGS. 9, 10A, and 10B illustrate the sample hints which are created according to preferred embodiments of the present invention to convey relationship information among objects, as determined by a content management system. Consider the case where a web page "x.html" contains an embedded image "x.jpg" and also has a reference (e.g. a hyperlink) to another web page "y.html" which itself contains an embedded image "y.gif". These web pages and objects are illustrated in FIG. 9. FIG. 10A shows a markup language document 1000 encoded in the Extensible Markup Language ("XML"), specifying the relationship information. In the sample syntax, a "<weight_message>" tag is used to denote that weights are being provided. As an example of how weights may be used, an indication of an embedded object might be assigned a high weight (e.g., 100) since the embedded object will typically need to be read from storage along with the page in which it was embedded. Hypertext links would preferably be assigned a lower weight (e.g., 10) since a hyperlinked page is selectable and will be retrieved in conjunction with its referencing page on only some occasions (and accordingly, it may be preferable not to locate the hyperlinked content in the immediately-contiguous storage locations). Thus, the embedded "x.jpg" image for web page "x.html" is assigned a weight of 100 for the message 1010 whose relationship source is "x.html" and whose relationship target is "x.jpg". In message 1020, a weight of 10 is assigned to the hyperlink reference which connects the target page "y.html" to the source page "x.html". Message 1030 specifies the relationship from source page "y.html" to its embedded image "y.gif".

While the sample document 1000 in FIG. 10A uses the XML notation, it will be obvious that the information reflected therein may be encoded in many other forms without deviating from the scope of the present invention. FIG. 10B shows one alternative form 1050, wherein the source object, target object, and weight are encoded as a comma-separated list and each such list is separated from other lists by a delimiter represented in FIG. 10B as "[newline]". In still another alternative notation (not shown), keywords may be used to convey relationships between pairs of objects. For example, the syntax "x.html, x.jpg, embedded_object" and "x.html, y.html, hyperlink" might be created by the content management system and passed to the file system for analysis. This alternative is discussed in more detail with reference to Block 1130 of FIG. 11.

FIG. 11 represents processing which occurs at a file system to support the present invention. At Block 1100, the file system accepts the file or files transmitted from the content management system, and preferably stores them in a temporary location (Block 1110). The file system then accepts the encoded hints (Block 1120). The hints are then analyzed (Block 1130) by the request optimizer component of the file system (or analogous component which may be included in, or accessed by, the file system) to determine the preferred storage layout of the files. This analysis process may also create information to be stored in a dependency table (see element 770 of FIG. 7), which may then be used for optimizing subsequent read operations according to the optional aspect described above. After completing the analysis, the temporarily-stored files are organized accordingly (Block 1140) and then passed to the storage system (Block 1150) for storing on the physical media. It should be noted that the organizing performed in Block 1040 may involve physically re-arranging the files in their temporary storage and/or moving them to other storage, or may alternatively be accomplished by a logical re-arrangement (e.g. using pointers or an analogous ordering technique). The analysis and layout processing of Blocks 1130 and 1140 will now be described in more detail.

In one embodiment, the content management system assigns weights to relationships during the processing discussed above with reference to Blocks 810 and 830 of FIG. 8, when the page affinities are determined and dependency information is encoded. These weights are then preferably transmitted by the content management system at Block 840, and used as input to the request optimizer. The syntax examples in FIGS. 10A and 10B reflect this approach. Alternatively, the dependency information may be passed from the content management system, after which the request optimizer of the file system assigns weights to each type of link, using the hints. This approach was previously described with reference to a syntax using keywords to denote the content relationships.

In one embodiment of the dependency analysis and storage layout process, the request optimizer of the file system uses an ordered list to determine the preferred storage order for files, based on their relationships. This process begins (Block 1200) by creating an empty dependency list "L". Next, the web site's root page "R" (typically, its home page) is identified (Block 1210). Or, if a portion of a web site is being deployed (or redeployed), then Block 1210 identifies the root page of this portion. For ease of reference, the following discussion uses the term "home page" to refer to the starting page of the web site or portion thereof which is being deployed. With reference to the example in FIGS. 9 and 10A, the root page is determined to be "x.html" in Block 1210, by virtue of its presence as the source element in the first <weight_message> 910.

Block 1220 inserts an identification of the home page R into the dependency list L.

Next, in Block 1230, the first element "E" from the dependency list L is removed. Block 1240 determines the storage locations to use for this element. The determination made in Block 1240 comprises ascertaining the size of the content to be stored, and computing a corresponding relative offset (i.e. an ending position) at which the next contiguous content can begin. (Note that in block-oriented storage systems, the next available position is typically located on a block boundary. Some storage systems may allow for allocation on "mini-block" or partial block boundaries; these latter systems typically have less wasted space in partially-filled blocks, but with a trade-off in performance. Still other storage systems may use other allocation strategies.) With reference to the example in FIGS. 9 and 10A, on the first pass through the logic of FIG. 12 the length of file "x.html" is used in Block 1240. Block 1250 then determines all pages or references "Pi" which are dependent on element e. In the example, the dependencies Pi are determined to be the image "x.jpg" and the hyperlinked page "y.html". In Block 1260, the pages Pi are sorted based on the weight of their dependency on element E, and Block 1270 inserts these sorted pages at the head of list L. With reference to the example, the most dependent file for root page "x.html" is the file "x.jpg", which has a dependency weight of 100, and therefore "x.jpg" will be inserted in list L prior to "y.html". Block 1280 checks to see if list L is currently empty. If so, then the storage locations for all files have been determined, and the processing of this invocation of FIG. 12 ends. Otherwise, when list L is not empty, control returns to Block 1230 to begin processing the next element.

Figure 12:
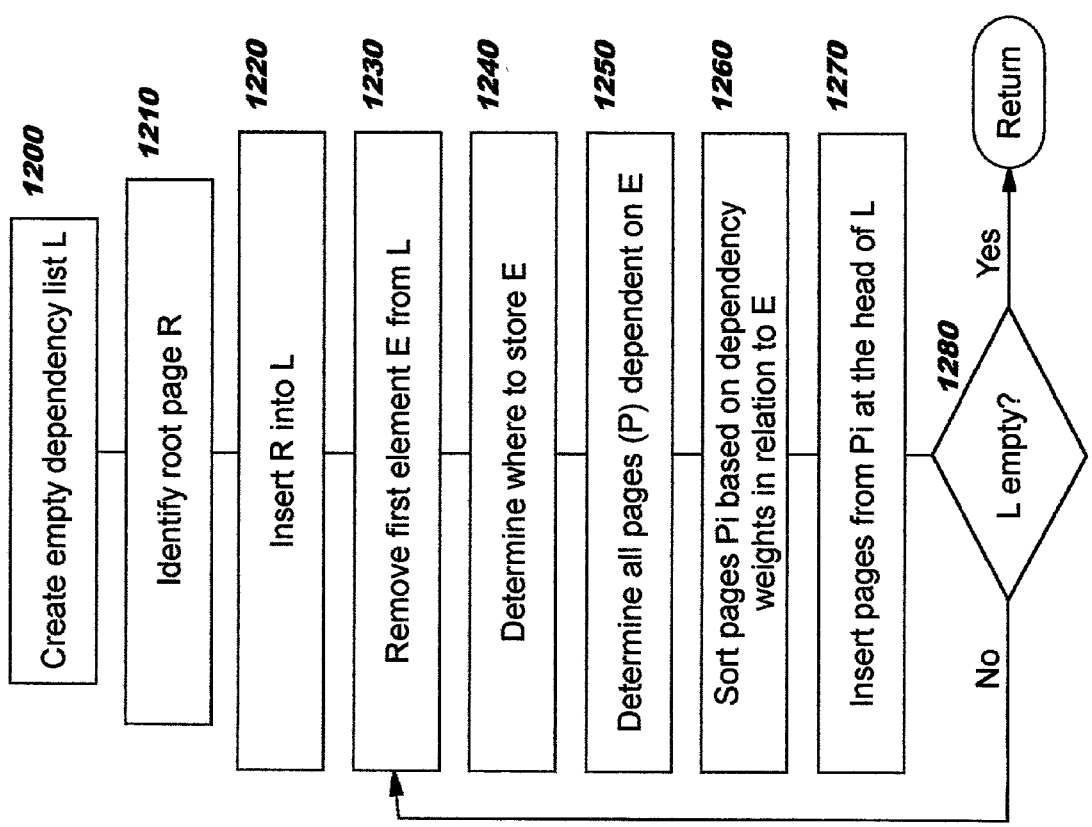

Referring again to the example in FIGS. 9 and 10A, it can be seen that the processing of FIG. 12 will determine that a preferred storage order for the files is (1) "x.html"; (2) "x.jpg"; (3) "y.html"; and (4) "y.gif".

In this manner, the most strongly dependent files are processed first, such that the file system can choose to place these files together (or can choose another arrangement, if contiguous placement is not deemed optimal for a particular implementation).

Note that this process relies on a storage system's tendency to store the blocks of a particular file contiguously, when possible. Whereas prior art file systems pass an individual file to a storage system, which uses a layout optimizer to determine how to allocate storage for multiple blocks of that one file (see FIG. 5), the present invention enables allocation to consider cross-file dependencies when allocating storage, as has been described. In this manner, both intra-file allocation (as in the prior art) and inter-file allocation (according to the present invention) can be optimized. While the invention is described with reference to a file system in which read access is optimized by laying out blocks contiguously, some storage systems benefit from other layouts. (For example, multi-arm systems may operate more efficiently when the content is positioned such that the arms can read the content concurrently. This technique is sometimes referred to in the art as "striping".) It will be apparent to one of skill in the art how the techniques which have been disclosed herein can be applied to such systems.

Figure 13:
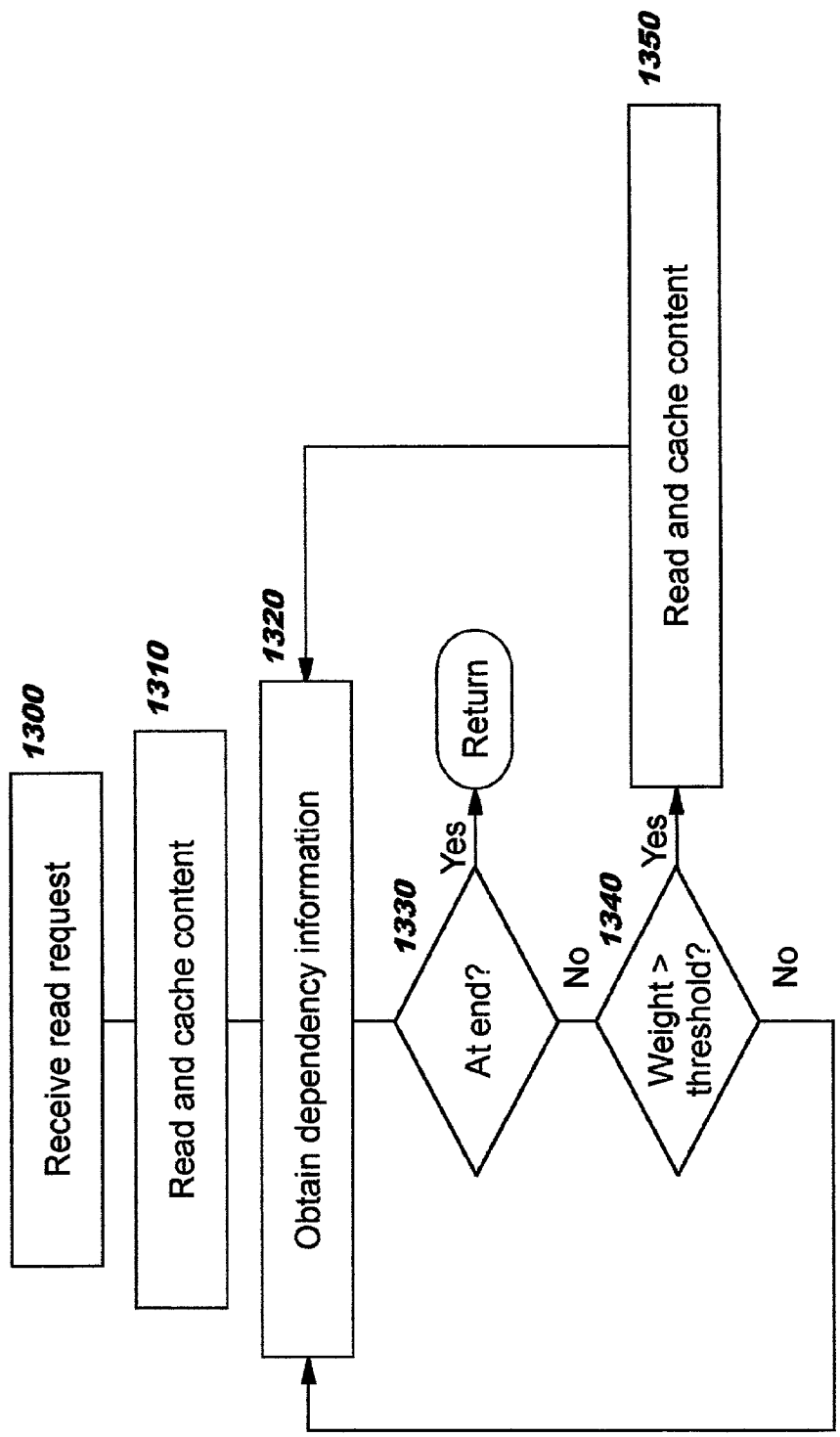

FIG. 13 illustrates logic which may be used to implement the optional aspect whereby read requests may result in pre-fetching content. A value referred to herein as a "pre-fetch threshold" is used. If a file which is identified in a read request has dependent objects whose dependency weight is greater than the pre-fetch threshold, then in this aspect, additional read requests will be issued for these objects as well. With reference to the example in FIG. 9, suppose for purposes of illustration that the content for file "x.html" has been stored in file storage blocks 1001, 1002, and 1003, which are contiguous, and in block 1006 which is not. Further suppose that the (highly-dependent) image in file "x.jpg" has been stored in contiguous storage blocks 2001 through 2005 and in non-contiguous storage block 2010. Encountering a read request for file "x.html", a prior art file system might recognize the need to read the entire file, and thus execute two parallel read operations for (1) blocks 1001–1003 and (2) block 1006. However, this prior art approach would miss the relationship to the embedded image "x.jpg".

Using the optimization provided by this aspect of the present invention, and in particular the knowledge provided in the hints from the content management system which indicate that file "x.html" is very strongly related to file "x.jpg", the file system implementing this aspect would also pre-fetch (i.e. read) the data comprising "x.jpg" from its storage blocks 2001–2005 and 2010, and then cache this data in preparation for the likely subsequent request for that content.

This process of determining a read request strategy begins (Block 1300) by receiving a read request for some file X. The data for the file is read and cached (Block 1310), preferably using prior art techniques. (In alternative embodiments, caching the requested file may be omitted, if desired.) File X's dependencies are then located (Block 1320) in the dependency table which was preferably created from the hints sent by the content management system when the content was being stored. Block 1330 checks to see if this is the end of the dependency processing for file X (that is, whether all of X's dependencies have been processed). If so, then the processing of FIG. 13 ends for this read request. Otherwise, Block 1340 compares the weight of the dependency which was located in Block 1320 to the pre-fetch threshold. If the dependency weight exceeds the threshold, then Block 1350 pre-fetches and caches that object. Control returns to Block 1320 in either case to obtain X's next dependent object.

Note that the value of the pre-fetch threshold can be tuned. A lower value for the threshold will increase the level of caching, and such caching will likely improve performance, but will require more cache memory; a higher value for the threshold will reduce the level of caching, and reduce the memory requirement, but may reduce the positive performance enhancement. The value to be used for the pre-fetch threshold in a particular implementation may be provided in a number of ways, such as by enabling a systems administrator to provide the value through a configuration interface or by reading the value from a configuration file.

As has been demonstrated, the present invention provides advantageous techniques for improving the storing of content in distributed computing environments by optimizing content placement using information derived from a content management system or other authoring system. The disclosed techniques reduce storage overhead, and thus improve the performance of web servers and the associated storage systems.

The disclosed techniques may also be used to implement improved methods of doing business. For example, network hosting services may implement the techniques of the present invention to access and retrieve file content in an improved manner. Providers of such services may offer these advantages to their customers for a competitive edge in the marketplace.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include both the preferred embodiment and all such variations and modifications as fall within the spirit and scope of the invention.

What is claimed is:

1. A method of storing content in a computing network, comprising:
   generating by a content authoring tool a plurality of files and hints that specify one or more of the files that are likely to be referenced within a temporal proximity of reference to a selected other one of the files;
   receiving at a storage system the plurality of files and hints from the content authoring tool; and
   using the received hints to allocate storage within the storage system for the files.

2. The method according to claim 1, wherein the selected file is a web page.

3. The method according to claim 2, wherein the one or more files that are likely to be referenced within a temporal proximity of reference to the selected file comprise at least one of (1) one or more embedded objects of the web page and (2) one or more other web pages which are hyperlinked to the web page.

4. The method according to claim 1, wherein the selected file is a text document.

5. The method according to claim 4, wherein the one or more files that are likely to be referenced within a temporal proximity of reference to the selected file comprise one or more objects which are embedded within or referenced by the text document.

6. The method according to claim 1, wherein the hints further specify weights which describe a degree of dependency that the one or more files will be referenced within a temporal proximity of reference to the selected file.

7. The method according to claim 1, wherein the hints are encoded in a markup language notation.

8. The method according to claim 7, wherein the markup language notation is Extensible Markup Language ("XML") notation.

9. The method according to claim 1, further comprising:
receiving a request for one of the files at the storage system;
retrieving the requested file from the allocated storage within the storage system; and
returning the retrieved file responsive to the request.

10. The method according to claim 1, further comprising:
using the received hints to create dependency information which is stored by the storage system in temporary or permanent storage;
receiving a request for one of the files at the storage system; and
determining a read request strategy for the requested file by accessing the stored dependency information.

11. The method according to claim 10, wherein the read request strategy comprises determining selected ones of the files which should be pre-fetched along with a read of the requested file.

12. The method according to claim 11, wherein determining selected ones of the files which should be pre-fetched further comprises comparing a dependency weight of the files to a pre-fetch threshold.

13. The method according to claim 12, wherein the pre-fetch threshold is used to tune the pre-fetch operation.

14. The method according to claim 11, further comprising:
retrieving the requested file from the allocated storage;
retrieving the selected ones of the files which should be pre-fetched from the allocated storage;
returning the retrieved requested file responsive to the request; and
caching the pre-fetched files.

15. The method according to claim 14, further comprising caching the retrieved requested file.

* * * * *